United States Patent [19]
Freese et al.

[11] Patent Number: 5,988,669
[45] Date of Patent: Nov. 23, 1999

[54] STROLLER WITH GRIP HANDLE

[75] Inventors: Theodore Brent Freese, Broomfield, Colo.; Alan David Bengtson, Shorewood, Wis.

[73] Assignee: Evenflo Company, Inc., Vandalia, Ohio

[21] Appl. No.: 08/731,997

[22] Filed: Oct. 25, 1996

[51] Int. Cl.⁶ .................................................. B62B 1/00
[52] U.S. Cl. ...................... 280/642; 280/647; 280/47.38; 280/650
[58] Field of Search .................... 280/642, 647, 280/644, 650, 47.38, 649; 296/35.4

[56] References Cited

U.S. PATENT DOCUMENTS

| | | | |
|---|---|---|---|
| D. 274,714 | 7/1984 | Cone | D12/129 |
| D. 296,540 | 7/1988 | Perego | D12/129 |
| D. 298,815 | 12/1988 | Kassai | D12/129 |
| D. 300,310 | 3/1989 | Kassai | D12/129 |
| D. 305,012 | 12/1989 | Bigo et al. | D12/129 |
| D. 305,013 | 12/1989 | Bigo et al. | D12/129 |
| D. 305,316 | 1/1990 | Lin | D12/129 |
| D. 305,317 | 1/1990 | Kassai | D12/129 |
| D. 307,249 | 4/1990 | Yee et al. | D12/129 |
| D. 307,250 | 4/1990 | Kassai | D12/129 |
| D. 307,879 | 5/1990 | Giambrone | D12/129 |
| D. 308,656 | 6/1990 | Takahashi et al. | D12/129 |
| D. 310,645 | 9/1990 | Julien | D12/129 |
| D. 311,363 | 10/1990 | Lin | D12/129 |
| D. 317,280 | 6/1991 | Takahashi et al. | D12/129 |
| D. 319,906 | 9/1991 | Takahashi et al. | D24/19 |
| D. 320,370 | 10/1991 | Takahashi et al. | D12/129 |
| D. 321,850 | 11/1991 | Mong-Hsing | D12/129 |
| D. 322,420 | 12/1991 | Hawkes | D12/129 |
| D. 325,550 | 4/1992 | Kato et al. | D12/129 |
| D. 328,047 | 7/1992 | Huang | D12/129 |
| D. 329,832 | 9/1992 | Ishikura et al. | D12/129 |
| D. 331,208 | 11/1992 | Peebles et al. | D12/129 |
| D. 335,642 | 5/1993 | Huang | D12/129 |
| D. 340,012 | 10/1993 | Azzarelli | D12/133 |
| D. 346,141 | 4/1994 | McConnell | D12/133 |
| D. 348,637 | 7/1994 | Globeman et al. | D12/129 |
| D. 352,259 | 11/1994 | Kaneko | D12/129 |
| D. 352,923 | 11/1994 | Kasaai | D12/129 |
| D. 357,439 | 4/1995 | Haut et al. | D12/129 |
| D. 357,440 | 4/1995 | Pietra | D12/133 |
| D. 359,015 | 6/1995 | Wang | D12/129 |
| D. 361,049 | 8/1995 | Beckman | D12/129 |
| D. 362,832 | 10/1995 | Haut et al. | D12/129 |
| D. 363,260 | 10/1995 | Huang | D12/128 |
| D. 365,710 | 1/1996 | Cunningham | D6/491 |
| D. 365,784 | 1/1996 | Wennerstrom et al. | D12/129 |
| D. 370,438 | 6/1996 | Haut et al. | D12/129 |
| 2,285,700 | 8/1942 | Feldman | 280/649 |
| 2,399,359 | 12/1946 | Kroll et al. | 280/649 |
| 3,575,461 | 4/1971 | Goldman et al. | 296/28 |
| 3,689,099 | 9/1972 | Patterson | 280/38 |
| 3,967,342 | 7/1976 | Gebhard | 16/48 |
| 4,108,468 | 8/1978 | Orlanski | 280/648 |
| 4,173,355 | 11/1979 | Perego | 280/642 |
| 4,216,974 | 8/1980 | Kassai | 280/42 |
| 4,232,897 | 11/1980 | Maclaren et al. | 297/45 |
| 4,241,930 | 12/1980 | Bell et al. | 280/47.29 |

(List continued on next page.)

FOREIGN PATENT DOCUMENTS 0 258 826  3/1988  European Pat. Off. .......... B62B 7/08

*Primary Examiner*—J. J. Swann
*Assistant Examiner*—James S. McClellan
*Attorney, Agent, or Firm*—Robert G. Crouch; Holland & Hart LLP

[57] ABSTRACT

An infant stroller with a conventional frame which can be collapsed by releasing a latch mechanism mounted on a central portion of the frame. The handle arms of the frame terminate in a handle assembly which includes a handle bar portion designed for two-handed operation and a handle grip designed for one-handed operation of the stroller. The handle grip is provided at an ergonomically comfortable angle in the range of 60 degrees from horizontal. A console tray is provided in the vicinity of the handle assembly for the operator to conveniently store various sundry items. The console tray supports a back edge of a canopy on the infant stroller. The canopy includes a canopy frame and a sunshade depending therefrom which is supported by a separate sunshade frame.

3 Claims, 3 Drawing Sheets

U.S. PATENT DOCUMENTS

| | | | |
|---|---|---|---|
| 4,428,598 | 1/1984 | Kassai | 280/644 |
| 4,542,915 | 9/1985 | Wheeler, III et al. | 280/642 |
| 4,564,212 | 1/1986 | Orlandino et al. | 280/642 |
| 4,582,355 | 4/1986 | Hall | 296/78 A |
| 4,606,550 | 8/1986 | Cone | 280/642 |
| 4,632,421 | 12/1986 | Shamie | 280/642 |
| 4,725,071 | 2/1988 | Shamie | 280/643 |
| 4,741,551 | 5/1988 | Perego | 280/642 |
| 4,762,335 | 8/1988 | Kassai | 280/649 |
| 4,763,911 | 8/1988 | Gebhard et al. | 280/37 |
| 4,763,919 | 8/1988 | Nakao et al. | 280/644 |
| 4,765,644 | 8/1988 | Bell | 280/641 |
| 4,765,645 | 8/1988 | Shamie | 280/644 |
| 4,768,795 | 9/1988 | Mar | 280/30 |
| 4,773,124 | 9/1988 | Nakao et al. | 16/35 R |
| 4,779,879 | 10/1988 | Kassai | 280/47.36 |
| 4,805,928 | 2/1989 | Nakao et al. | 280/642 |
| 4,813,739 | 3/1989 | Miller | 297/184 |
| 4,817,982 | 4/1989 | Kassai | 280/644 |
| 4,819,958 | 4/1989 | Perego | 280/644 |
| 4,832,361 | 5/1989 | Nakao et al. | 280/642 |
| 4,836,573 | 6/1989 | Gebhard | 280/644 |
| 4,848,787 | 7/1989 | Kassai | 280/642 |
| 4,856,809 | 8/1989 | Kohus et al. | 280/644 |
| 4,892,327 | 1/1990 | Cabagnero | 280/650 |
| 4,906,017 | 3/1990 | Kassai | 280/642 |
| 4,915,401 | 4/1990 | Severson et al. | 280/30 |
| 4,921,270 | 5/1990 | Schoberg | 280/655.1 |
| 5,056,805 | 10/1991 | Wang | 280/47.36 |
| 5,071,146 | 12/1991 | Lewis et al. | 280/30 |
| 5,104,180 | 4/1992 | Takahashi et al. | 297/16 |
| 5,121,940 | 6/1992 | March | 280/644 |
| 5,123,767 | 6/1992 | Ishikura et al. | 403/24 |
| 5,143,398 | 9/1992 | Teng | 280/642 |
| 5,144,717 | 9/1992 | Siesholtz et al. | 16/47 |
| 5,149,115 | 9/1992 | Sampedro | 280/33.998 |
| 5,158,319 | 10/1992 | Norcia et al. | 280/643 |
| 5,167,425 | 12/1992 | Chen | 280/648 |
| 5,168,601 | 12/1992 | Liu | 16/126 |
| 5,181,735 | 1/1993 | Onishi | 280/642 |
| 5,184,835 | 2/1993 | Huang | 280/47.371 |
| 5,192,091 | 3/1993 | Liu | 280/644 |
| 5,195,770 | 3/1993 | Ishikura | 280/648 |
| 5,197,753 | 3/1993 | Liu | 280/642 |
| 5,201,535 | 4/1993 | Kato et al. | 280/30 |
| 5,203,577 | 4/1993 | Kato et al. | 280/30 |
| 5,205,577 | 4/1993 | Liu | 280/642 |
| 5,205,578 | 4/1993 | Liu | 280/642 |
| 5,205,579 | 4/1993 | Kato et al. | 280/642 |
| 5,230,523 | 7/1993 | Wilhelm | 280/30 |
| 5,244,228 | 9/1993 | Chiu | 280/642 |
| 5,256,025 | 10/1993 | Williamson | 414/490 |
| 5,257,799 | 11/1993 | Cone et al. | 280/642 |
| 5,382,074 | 1/1995 | Pietra | 297/153 |
| 5,417,450 | 5/1995 | Wang | 280/642 |
| 5,454,584 | 10/1995 | Haut et al. | 280/642 |
| 5,472,224 | 12/1995 | Cabagnero | 280/642 |
| 5,490,685 | 2/1996 | Kitayama et al. | 280/47.38 |
| 5,522,639 | 6/1996 | Jaime | 297/184.13 |
| 5,531,238 | 7/1996 | Azzarelli et al. | 135/66 |
| 5,845,916 | 12/1998 | Stroud | 280/47.38 |
| 5,876,046 | 5/1999 | Courtney et al. | 280/30 |
| 5,876,057 | 3/1999 | Huang | 280/642 |

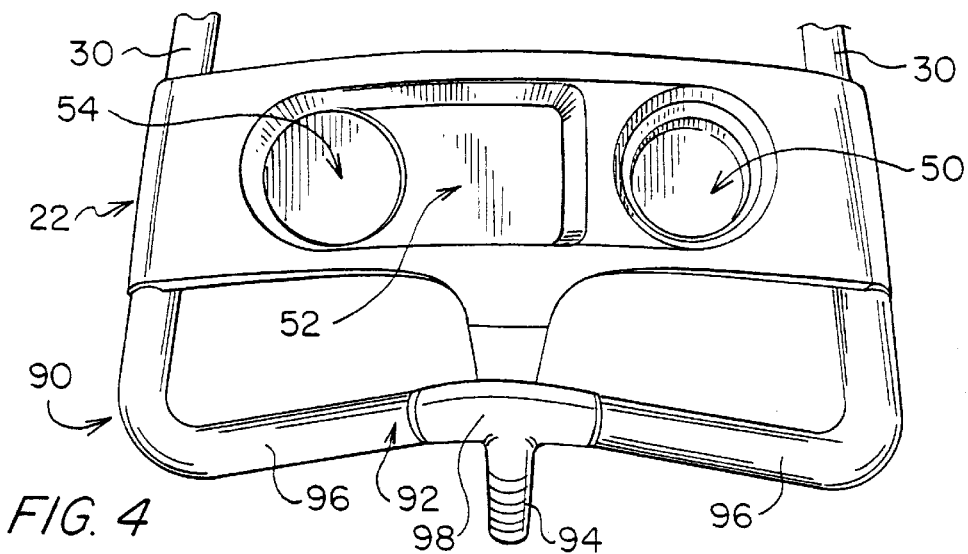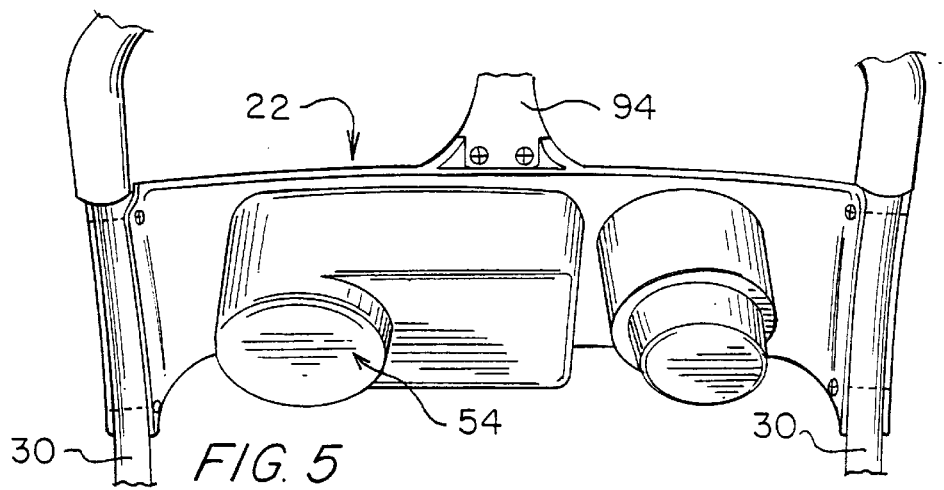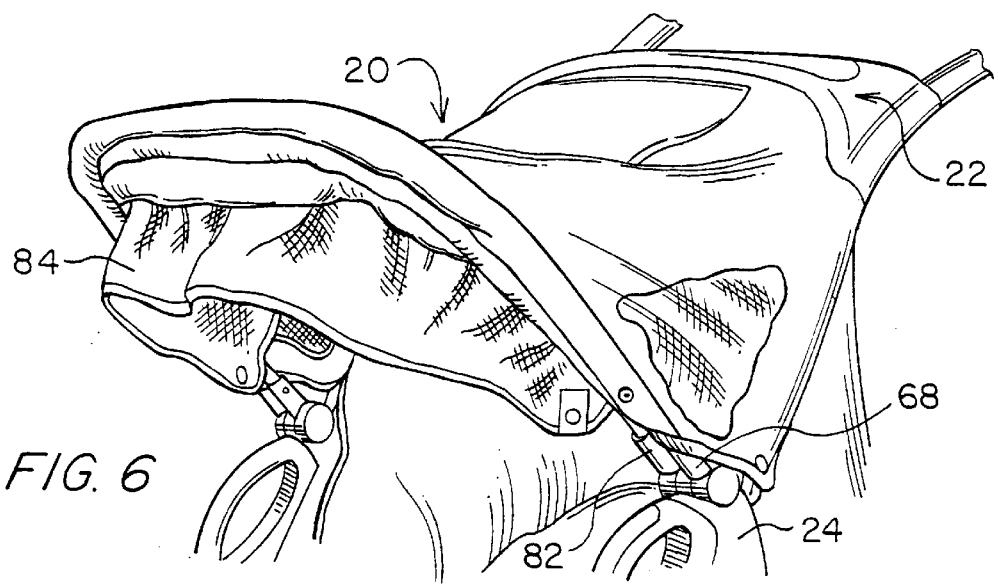

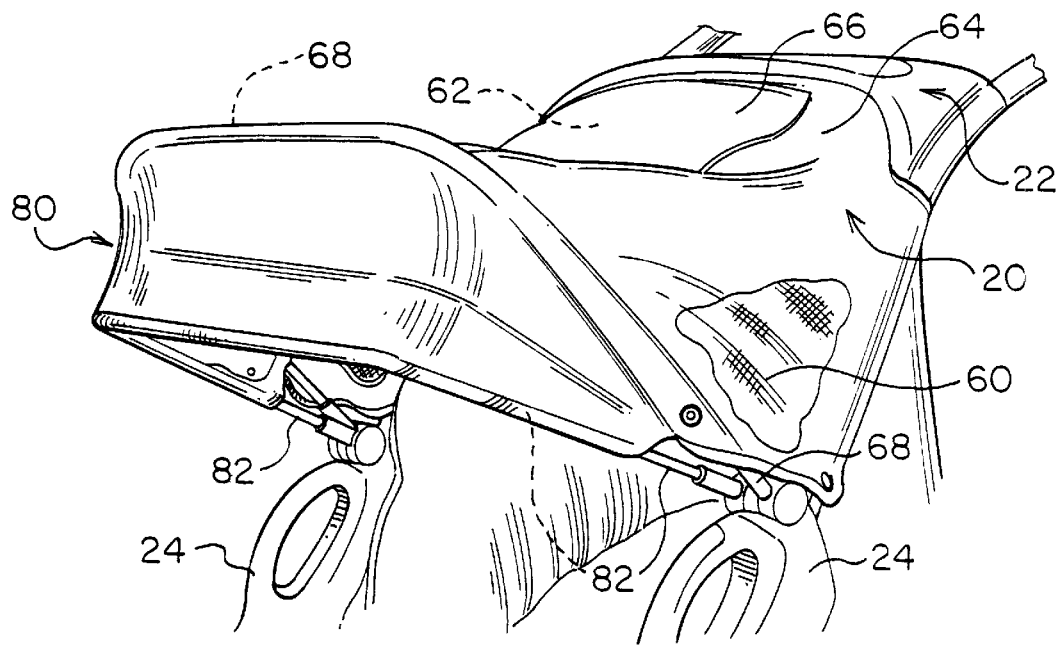
FIG. 7
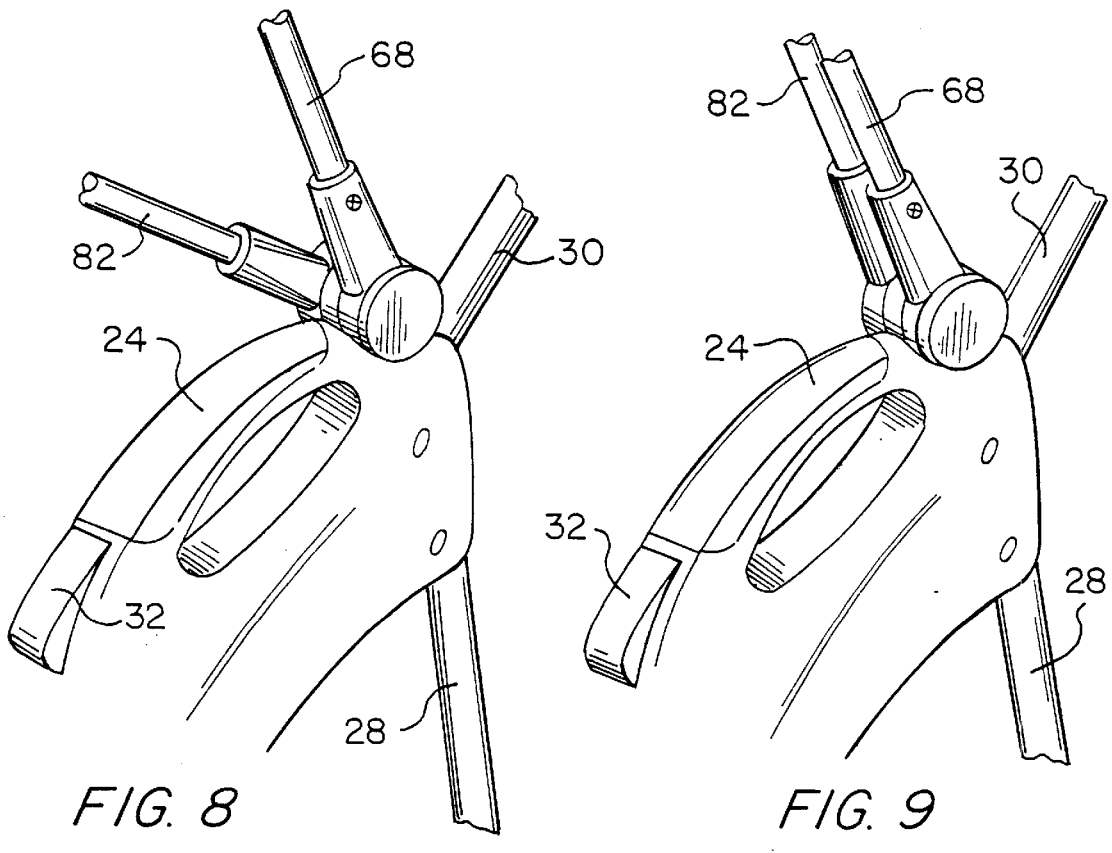
FIG. 8
FIG. 9

STROLLER WITH GRIP HANDLE

The present invention relates to an improved design for an infant stroller, and more particularly, to an infant stroller which includes a novel structure for one-handed operation of the stroller, a convenient storage container on the stroller, and an improved sun-shade on the stroller.

BACKGROUND OF THE INVENTION

Modern infant strollers typically include a frame, an infant support or seat, and four sets of wheels. Typically, the rear sets of wheels are fixed in orientation, while the front sets of wheels serve as castors to be able to pivot in any direction. While pivotable wheels are desirable for maneuvering the stroller, they are inherently less stable directionally than fixed wheels. Nevertheless, any instability which may be caused by the pivotable wheels is compensated and adjusted for by the operator via relative movement of the operator's two hands in the normal two-handed push operation. Occasionally, the operator is confronted with a situation where it is desirable to be able to operate the stroller with a single hand.

Single-handed operation of strollers is difficult at best with current stroller designs. Stroller handles are typically horizontal (or nearly horizontal) bars which may be grasped by both hands of the operator. To push such a stroller with a single hand would include placing the hand at the central portion of the horizontal bar. Unfortunately, grasping a horizontal bar with a single hand and attempting to impart forward motion to the stroller while also controlling side-to-side movement is not inherently easy. This is partially because grasping the central portion of a horizontal bar on the stroller in front of the operator is not ergonomically comfortable. Some other stroller designs include a pair of single-handed grip handles at the two extreme positions on the horizontal bar. This approach does not easily provide for single-handed operation either, since grasping either of the two handles at the extreme positions does not place the hand in a central position which is necessary to easily push and control the stroller.

Another characteristic of stroller use is that, on extended trips with the stroller, the operator may have various sundry items to be carried, e.g., a purse, a beverage, shopping purchases, or supplies for the infant such as diapers and bottles. Typically, these items must be carried by the operator, slung over the operator's shoulders in some manner, or placed in the infant seat with the infant. Some modern strollers provide a storage basket under the seat for storage of such items. While such a storage basket is clearly an improvement over the absence of one, the location can be inconvenient if it is necessary to frequently place items into and remove them from the basket. Also, such a storage basket may not hold beverages and baby bottles in the desired upright position.

In addition, it is always desirable to maximize the protection provided for the infant. Most stroller designs include a canopy attached to the frame to at least partially protect the infant from adverse elements such as sun, wind, rain, etc. Typically, such canopies are supported by a canopy frame. Unfortunately, such adverse elements do not always approach the infant from directly thereabove. In order to further increase the protection provided by the canopy, some designs include fabric panels which depend downwardly from the canopy. Such fabric panels may limit the vision of the infant when the panels are not desired. Further, the panels may be rendered ineffective by wind, etc.

It is against this background and the desire to solve the problems of the prior art that the present invention has been developed.

SUMMARY OF THE INVENTION

Accordingly, it is an object of the present invention to provide an improved handle for one-handed operation of an infant stroller.

It is also an object to provide a combination handle with a portion designed for easy one-handed operation and with portions for ergonomically comfortable two-handed operation.

It is further an object of the present invention to provide a suitable container in a convenient location on an infant stroller for holding various sundry items.

It is still further an object of the present invention to provide an improved canopy for an infant stroller.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a an infant stroller for a user to utilize in transporting an infant across a support surface, the stroller including a frame, at least four wheels attached to the frame, and an infant support attached to the frame. The frame includes a push handle bar portion defined thereon and a push handle grip defined thereon. The handle bar portion is adapted for pushing the stroller with both hands of the user, while the handle grip is adapted for pushing the stroller by a single hand of the user. The handle grip is located at a position on the frame which is substantially along a central longitudinal axis of the frame, the longitudinal axis being aligned with the intended direction of movement of the stroller. The push handle bar portion may be formed in an inverted-V shape. The handle grip may be attached to the handle bar portion at an apex of the inverted-V shape. The handle grip may be elongated and attached to the handle bar portion at one end of the handle grip, and the stroller may also include a console tray attached to the frame proximate to the push handle bar portion, the handle grip being attached to the console tray at a second end of the handle grip.

The present invention is also directed to an infant stroller for a user to utilize in transporting an infant across a support surface, the stroller including a frame, at least four wheels attached to the frame, and an infant support attached to the frame. The frame includes a central, handle grip portion which is elongated and which has a longitudinal axis that is closer to alignment with a vertical axis than to a horizontal axis.

The longitudinal axis of the handle grip portion may lie at an angle from horizontal which is in a range from 46 degrees to 75 degrees. The longitudinal axis of the handle grip portion may lie at an angle from horizontal of approximately 60 degrees.

The present invention is also directed to an infant stroller for a user to utilize in transporting an infant across a support surface, the stroller including a frame which is selectively collapsible between a collapsed position and an operating position, the frame including a handle portion defined thereon and a console tray adapted for holding sundry items attached to the frame in the vicinity of the handle portion. The stroller also includes at least four wheels attached to the frame and an infant support attached to the frame.

The stroller may further include a canopy attached to the frame and suspended in part from the console tray along a back edge of the canopy. The console tray may have at least one compartment defined therein for holding sundry items. The console tray may have two compartments, at least one of which is suitable for receiving and holding a beverage container.

The present invention is also directed to an infant stroller for a user to utilize in transporting an infant across a support surface, the stroller including a frame, at least four wheels attached to the frame, an infant support attached to the frame, and a canopy attached to the frame above the infant support for protecting the infant in the infant support from adverse elements. The canopy includes a canopy frame for supporting the canopy, and the canopy further includes a sunshade depending therefrom and supported by a sunshade frame, the sunshade frame and the canopy frame being movable relative to each other to allow the sunshade to be selectively extended or retracted.

The sunshade may be supported from above by the canopy frame and from below by the sunshade frame. The canopy may further include a sunshade cover for selectively covering the sunshade when the sunshade is retracted. The sunshade cover may be attached along one edge thereof to the canopy on a first side of the sunshade and may be selectively attachable along an opposite edge thereof to the canopy on an opposite side of the sunshade. The canopy and sunshade may be movable relative to the frame to allow the canopy to be selectively retracted or extended. The canopy frame and the sunshade frame may be pivotably mounted to the frame. The pivotable mounting of the canopy frame and the sunshade frame may be on the same axis, wherein the amount that the sunshade frame can be pivoted relative to the canopy frame is constrained by the size of the sunshade, and further wherein movement of the canopy frame toward the retracted or extended position will pull the sunshade frame along therewith.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings:

FIG. 4 is an enlarged top view of the handle portion shown in FIG. 3;

FIG. 5 is an enlarged rear perspective view of a console tray connected to the handle portion of the stroller of FIG. 1;

FIG. 6 is an enlarged perspective view of a canopy on the infant stroller of FIG. 1;

FIG. 7 is an enlarged perspective view of the canopy shown in FIG. 6, with a sunshade shown in an extended position;

FIG. 8 is an enlarged perspective view of a fragmentary portion of the left side of the canopy and sunshade of FIG. 7, showing a sunshade frame in an extended position relative to a canopy frame; and FIG. 9 is an enlarged perspective view similar to the view of FIG. 8, showing the sunshade frame in a retracted position relative to the canopy frame.

DETAILED DESCRIPTION OF THE PREFERRED EMBODIMENTS

Figure 1:
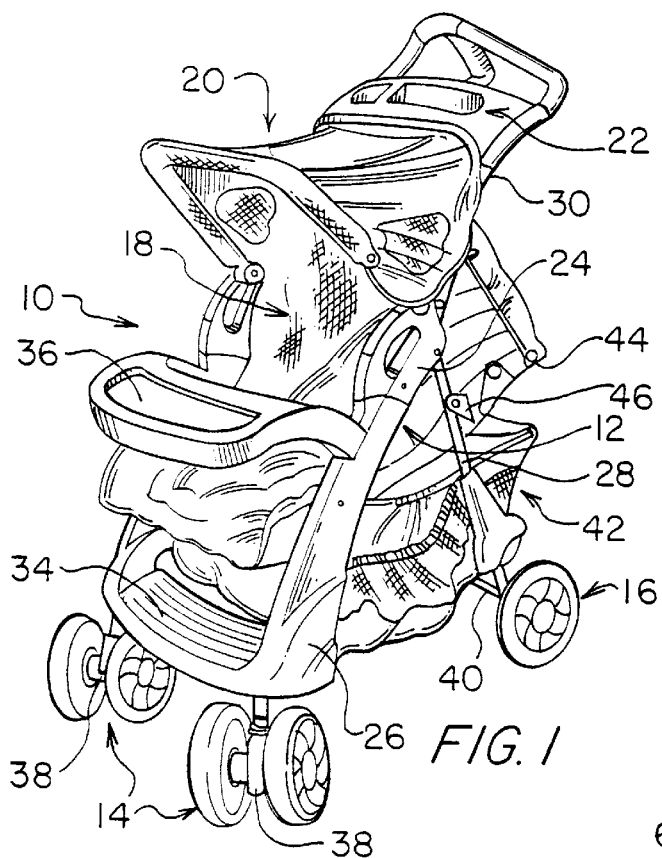
FIG. 1 is a perspective view of an improved infant stroller of the present invention.
Figure 3:
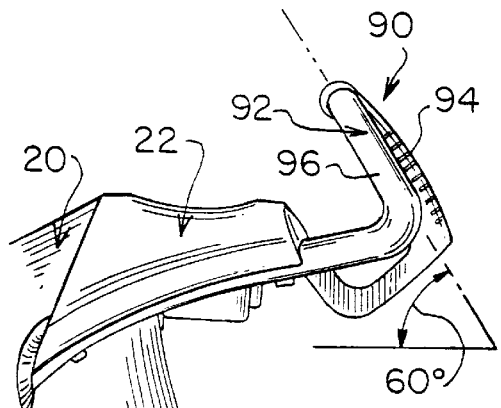
FIG. 3 is a side view of the handle portion of the infant stroller of FIG. 1.

An improved convenience stroller 10 adapted for carrying and transporting an infant (not shown) across support surfaces such as floors, sidewalks, streets, and any other suitable terrain is shown in FIG. 1. The stroller 10 includes a frame 12 which is supported by four sets of wheels, two swiveled front sets of wheels 14 and a pair of rear wheels 16. An infant support or seat 18 is attached to the frame 12 for supporting the infant. A canopy 20 and a console tray 22 are also attached to the frame 12 above the seat 18.

The frame 12 is collapsible in the manner which is customary for convenience strollers. Located on each side of the frame is a latch mechanism 24 to which a front leg 26, a rear leg 28, and a handle arm 30 each connect. The latch mechanism 24 is mounted on a lower end of the handle arm 30 to selectively hold or release the front leg 26, rear leg 28, and handle arm 30 in a fixed position relative to each other. The latch mechanism 24 has a push button 32 which, when actuated, releases the latch from the front leg 26 and thus allows the front leg 26 to be pivoted relative to the handle arm 30 in a direction that collapses the stroller 10. The pivoting action occurs about an axis at a lower end of the latch mechanism 24.

The rear leg 28 is pivotably connected at an upper end thereof to an upper end of the latch mechanism 24. The pivotable connection is such that the rear leg 28 can only pivot a fixed amount and thus the rear leg 28 will remain spaced apart from the front leg 26 when the latch mechanism 24 is latched to the front leg 26, retaining the stroller 10 in an open or non-collapsed position.

The two front legs 26, one on each of the right and left sides of the stroller 10, are connected together by a footboard 34. An infant tray 36 may also be connected to the front legs 26, the infant tray 36 being placed in front of the infant to support toys (not shown) or other objects as desired. The front set of wheels 14 on each of the right and left sides of the stroller 10 is connected by a castor 38 to the lower end of each of the front legs 26. The rear wheels 16 are each mounted on a rear axle 40 which is connected between lower ends of the rear legs 28.

Figure 2:
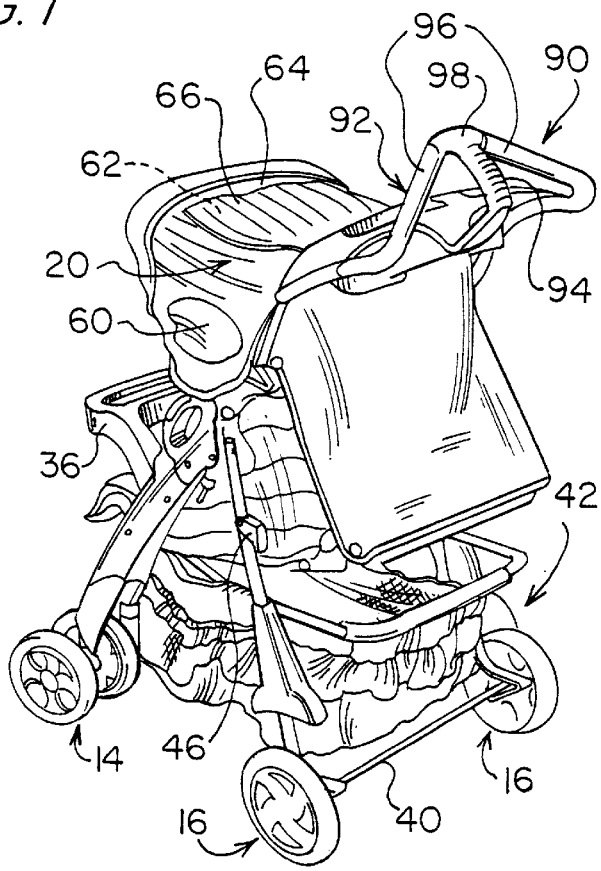
FIG. 2 is a perspective view of the improved stroller of FIG. 1, showing a back portion thereof, and particularly a handle portion of the stroller.

A lower storage basket 42 is slidably connected in the fashion of a drawer to the front legs 26 and rear legs 28 of the stroller 10. The basket 42 may be selectively slid into its storage position, as shown in FIG. 2, or drawn toward its extended position (not shown) which protrudes from the rear of the stroller 10.

The seat 18 is conventional in construction, including fabric panels which are stitched together and attached to the stroller 10 along the front legs 26 and handle arms 30. The seat 18 also includes a reinforced back rest 44 which can be placed into an upright position (not shown) substantially in alignment with the handle arms 30 or into an inclined position, as shown in FIGS. 1 and 2. A back rest latch mechanism 46 is provided on the seat 18 and handle arm 30 for selectively latching the seat 18 into the upright position.

The elongated console tray 22, best seen in FIGS. 4–7, is attached at opposite ends thereof to the right and left handle arms 30. The console tray 22 includes a pair of molded compartments defined therein. The first molded compartment 50 is suitable for holding a beverage container (not shown) while the second molded compartment 52 is suitable for holding larger items such as a small purse, etc (not shown). Defined in the bottom of the second molded compartment 52, is a depression 54 which may also serve to hold a beverage container.

The canopy 20 is preferably composed of fabric material with mesh side portions 60 which are provided to allow more light and fresh air into the area between the seat 18 and canopy 20, where the infant will be located. The canopy 20 also includes an upper window 62 on a top side thereof 64 which is provided with a selectively retractable window covering 66 which can be used to cover the windows 62. The canopy 20 is supported along a back edge thereof by attachment to the console tray 22. The canopy 20 is supported along side edges thereof by attachment to the right and left handle arms 30. The canopy is supported along a front edge thereof by attachment to a canopy support frame bar 68. The canopy support frame bar 68 is pivotably mounted to the latch mechanism 24. The pivotable nature of the mounting allows the canopy support frame bar 68 to be pivoted to a fully retracted position where the canopy support frame bar 68 is substantially aligned with the handle arms 30. In this position, the canopy 20 is fully retracted and is not operational to protect the infant in the seat 18. The canopy support frame bar 68 can be pivoted through a plurality of intermediate positions to a fully extended position, as shown in FIGS. 1, 2, and 6–9, where the canopy is fully extended and does serve to protect the infant in the seat 18 below from adverse elements.

A sunshade 80 depends from the front edge of the canopy 20 and is supported from above by attachment to the canopy support frame bar 68, as shown in FIG. 7. The sunshade 80 is selectively supported from below by attachment to a sunshade support frame bar 82. The sunshade support frame bar 82 is pivotably mounted to the latch mechanism 24 adjacent the pivotable mounting of the canopy support frame bar 68, so that the two pivotable mountings provide for pivoting about the same axis. The sunshade support frame bar 82 can be pivoted independently of the canopy support frame bar 68. The sunshade support frame bar 82 is shown in the fully extended position (relative to the canopy support frame bar 68) in FIGS. 7 and 8 and in a retracted position (relative to the canopy support frame bar 68) in FIGS. 1, 2, 6 and 9. Because of the attachment of the sunshade 80 to each of the canopy support frame bar 68 and sunshade support frame bar 82, sufficient movement of either of the frame bars 68 and 82 will eventually pull the other of the frame bars 68 and 82 in the same direction.

As can be seen in FIGS. 1 and 6, the sunshade 80 can be held in its fully retracted position by a sunshade cover flap 84 which is attached to and depends downwardly from the canopy support frame bar 68. The sunshade cover 84 is provided with portions of snap closures at either ends thereof which selectively can be matingly engaged with matching portions of snap closures mounted on the canopy support frame bar 68. The sunshade cover 84 is shown in a covering position in FIG. 1 and in an uncovered position in FIG. 6.

The pivotable mounting of the sunshade support frame bar 82 and the canopy support frame bar 68 to the latch mechanism 24 are detented systems in which detents are provided at the fully extended and fully retracted positions as well as at a plurality of intermediate positions. Thus, due to the detents, the sunshade support frame bar 82 will initially remain in the fully retracted position when the sunshade cover 84 is removed, as shown in FIG. 6. The sunshade support frame bar 82 may then be manually pulled out of the retracted position and toward the fully extended position, as shown in FIG. 7.

A multi-part handle assembly 90 is formed at upper ends of the handle arms 30. The handle assembly 90 includes an ergonomically-shaped handle bar portion 92 and an elongated handle grip portion 94 depending downwardly therefrom. The handle bar portion 92 includes two symmetrical sides 96 to the handle bar portion 92, forming an inverted and flattened "V" shape. The symmetrical sides 96 join together at an apex 98 on the handle assembly 90 which is coincident with the point where the handle grip portion 94 depends downwardly therefrom. The handle grip portion 94 and the apex 98 are centrally located relative to the handle assembly 90 as seen from above in FIG. 4. Further, the handle grip portion 94 is substantially within a vertical plane of symmetry which bisects the stroller 10, and in which plane lies a longitudinal axis to the stroller 10. Of course, the plane of symmetry is not an exact plane of symmetry as certain details on the left-hand side of the stroller are not identically replicated on the right-hand side as is illustrated by the variations in the compartments 50 and 52 on the console tray 22. Since the plane of symmetry bisects the front sets of wheels 14 from each other and bisects the rear axle 40, the handle grip portion 94 is well located relative to all the wheels 14 and 16 to be able to push the stroller 10 in a straight-forward direction and maneuver the stroller 10 as desired.

The handle grip portion 94 is attached at a bottom end thereof to a central portion of the console tray 22. The handle grip portion 94 is formed along a longitudinal axis which is at an angle relative to horizontal which is ergonomically comfortable. The longitudinal axis of the handle grip portion 94 is preferably at an angle closer to vertical than to horizontal and thus at an angle from horizontal between 45 degrees and 90 degrees. More precisely, this angle is preferably in the range of 60 degrees.

As can be appreciated, for two-handed operation of the stroller 10, the operator can place his/her hands on the handle bar portion 92, one hand on each of the symmetrical sides 96. For one-handed operation, the operator can place either hand on the handle grip portion 94 of the handle assembly 90. Because of the ergonomically comfortable and relatively strong grip position provided by the angle of the handle grip portion 94, the operator can push the stroller 10 and maneuver it as necessary as well as compensate for any instability that may occur due to the pivotable nature of the front sets of wheels 14.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. An infant stroller for a user to utilize in transporting an infant across a support surface, the stroller comprising:

a frame which is selectively collapsible between a collapsed position and an operating position, the frame including a handle portion defined thereon and a console tray adapted for holding sundry items attached to the frame in the vicinity of the handle portion;

at least three wheels attached to the frame;

an infant support attached to the frame; and a canopy attached to the frame and suspended in part from the console tray along a back edge of the canopy.

2. An infant stroller as defined in claim 1, wherein the console tray has at least one compartment defined therein for holding sundry items.

3. An infant stroller as defined in claim 2, wherein the console tray has two compartments, at least one of which is suitable for receiving and holding a beverage container.

* * * * *